(12) United States Patent
Cesko

(10) Patent No.: US 11,346,029 B2
(45) Date of Patent: May 31, 2022

(54) METHOD AND DEVICE FOR PROCESSING OF FILTER MATERIAL, PRODUCT OBTAINED THEREOF

(71) Applicant: Vladimir Cesko, Belusa (SK)

(72) Inventor: Vladimir Cesko, Belusa (SK)

( * ) Notice: Subject to any disclaimer, the term of this patent is extended or adjusted under 35 U.S.C. 154(b) by 831 days.

(21) Appl. No.: 16/069,901

(22) PCT Filed: Jan. 15, 2017

(86) PCT No.: PCT/IB2017/050211
§ 371 (c)(1),
(2) Date: Jul. 13, 2018

(87) PCT Pub. No.: WO2017/122182
PCT Pub. Date: Jul. 20, 2017

(65) Prior Publication Data
US 2019/0017202 A1    Jan. 17, 2019

(30) Foreign Application Priority Data

Jan. 15, 2016 (SK) ................................. 50004-2016
Jan. 15, 2016 (SK) ................................. 50006-2016
Jan. 15, 2016 (SK) ................................. 50007-2016

(51) Int. Cl.
*B01D 53/02* (2006.01)
*D04H 1/02* (2006.01)
(Continued)

(52) U.S. Cl.
CPC .......... *D04H 1/02* (2013.01); *B01D 39/1623* (2013.01); *B01D 53/02* (2013.01); *B01J 20/20* (2013.01);
(Continued)

(58) Field of Classification Search
CPC .... B01D 2239/0407; B01D 2239/0457; B01D 2239/1225; B01D 2253/102;
(Continued)

(56) References Cited

U.S. PATENT DOCUMENTS 3,630,458 A    12/1971  Smiley
4,030,865 A    6/1977   Kobayashi
(Continued)

FOREIGN PATENT DOCUMENTS

CN    204325589    5/2015
DE    4436337      4/1996
(Continued)

*Primary Examiner* — Christopher P Jones
(74) *Attorney, Agent, or Firm* — DeFillo & Associates; Evelyn A DeFillo

(57) ABSTRACT

Filter material, mainly in form of industrial remnants from the production of the filter fillings, is processed without the intake of the heat in such a way that it is cut in the disintegrator (4) at the presence of the air, where the material is during retention time repeatedly led to the contact with the rotating blades and bunches emerge in the disintegrator (4) through aeration. The flat carrier (3) is thus at least partially disintegrated to the original fibers (1); the released fibers (1) intertwine into bunches and the active carbon (2) is released from the original bond with the flat carrier (3). The swirl (vortex) created inside the disintegrator (4) carries the dust particles of the active carbon (2) and they adhere to the surface of the fibers (1). Part of the released active carbon (2) is—after the separation—carried away from the emergin bunches, which in the lower part of the disintegrator (4) run through the sieve out of the disintegrator (4). The resulting product is advantageously applicable as heat and noise isolation in all fields of technology, for example construction. The separated active carbon (2) in form of granules is also a resulting product of processing.

14 Claims, 4 Drawing Sheets

(51) Int. Cl.
  *D01G 11/00* (2006.01)
  *B29B 17/04* (2006.01)
  *B02C 13/06* (2006.01)
  *B02C 13/282* (2006.01)
  *B02C 21/00* (2006.01)
  *B01J 20/20* (2006.01)
  *B01J 20/30* (2006.01)
  *B01D 39/16* (2006.01)

(52) U.S. Cl.
  CPC .......... *B01J 20/3021* (2013.01); *B02C 13/06* (2013.01); *B02C 13/282* (2013.01); *B02C 21/00* (2013.01); *B29B 17/0412* (2013.01); *D01G 11/00* (2013.01); *B01D 2239/0407* (2013.01); *B01D 2239/0457* (2013.01); *B01D 2239/1225* (2013.01); *B01D 2253/102* (2013.01); *B01D 2253/25* (2013.01); *B01D 2257/708* (2013.01); *B01D 2259/4516* (2013.01); *B29B 2017/0476* (2013.01); *D10B 2321/02* (2013.01); *D10B 2505/04* (2013.01); *Y02W 30/66* (2015.05)

(58) Field of Classification Search
  CPC .......... B01D 2253/25; B01D 2257/708; B01D 2259/4516; B01D 53/02; B01D 39/1623; B01J 20/3021; B02C 13/06; B02C 13/282; B02C 21/00; B29B 17/0412; D10B 2321/02; D10B 2505/04
  See application file for complete search history.

(56) References Cited

U.S. PATENT DOCUMENTS

| 4,160,059 | A | * | 7/1979 | Samejima | .......... B01J 20/28004 131/342 |
| 4,247,315 | A | * | 1/1981 | Neumann | ............ B01D 46/002 55/350.1 |
| 6,029,916 | A | * | 2/2000 | White | .................... B29B 17/02 241/24.19 |
| 2006/0000767 | A1 | | 1/2006 | Trauger | |

FOREIGN PATENT DOCUMENTS

| GB | 1224325 | 3/1971 |
| HU | 227329 | 3/2011 |
| JP | S57112414 | 7/1982 |
| JP | H09418 | 1/1997 |

* cited by examiner

US 11,346,029 B2

METHOD AND DEVICE FOR PROCESSING OF FILTER MATERIAL, PRODUCT OBTAINED THEREOF

CROSS REFERENCE TO RELATED APPLICATION

This application is a national stage entry of PCT/ib2017/050211 filed Jan. 15, 2017, under the International Convention claiming priority over Slovak Patent Application No. PP50004-2016 filed Jan. 15, 2016; Slovak Patent Application No. PP50006-2016 filed Jan. 15, 2016; and Slovak Patent Application No. PP50007-2016 filed Jan. 15, 2016.

FIELD OF THE INVENTION

The invention concerns the method and device for processing the remnants of the filter material which contains an active carbon and which is used for the production of filters, mainly filters for cleaning of the air. The new method and device valorizes the original raw filter materials, whereby in the resulting product a non-degraded features of the original materials are used.

STATE OF THE PRIOR ART

Methods are known where the used filters, filter inserts and filter fillings of various materials are processed. Cleaning of the recycled raw material—that is, the removal of impurities which the filters have captured within their structures during their lifetime—is usually a part of such methods. Within their carrier structure—for example, within the frame—the filters have stacked a filter filling with the appropriate surface available for the transfer of the filter medium.

The filter filling is cut out during the production of the filter; it is cut from flat semi-finished product, which is permeable for the filter medium and captures the required kind of the impurities. Pursuant to the shape of the filter filling and pursuent to the method of composition of the flat semi-finished products into the shape of the filter filling, a various waste is produced during the production—for example, in form of edges, cut-outs and similar remnants. These remnants are not contaminated, they are no dangerous or biologically contaminated waste. In terms of weight they are only small part of the processed semi-finished products, it is therefore simplest to process them as used filter material. This corresponds to the common procedure during the recyclation, when the product with lower use value is produced from the waste.

In cases of certain types of the filters—such as cabin filters to the motor vehicles, air filters in home and in industry—precious materials are used for production of the filter filling in order to ensure the high quality of the breathed air in the space. Such filters use active carbon captured on the carrier grid. For example, in case of the cabin filters the active carbon is used applied on the layer of the non-woven polypropylene fabric or, eventually, applied in the sandwich between multiple layers of the carrier, for example in the arrangement carrier/carbon/carrier/carbon/carrier. Active carbon in this application can be produced from natural raw materials, for example from a coconut wood. This increases the value of the material which is recycled together with the used filters. The amount of waste with the active carbon during current production processes increases. Taking the increase in environmental pollution into account, this trend is most probably permanent.

Solution according to publication JPH09418 (A) concerns the processing of the used carpets, where the cutter divides the carpet to thin and long pieces which are subsequently cut to granules. The resulting product has low applicability and in case of application to the filter material the degradation of the original features of the materials will occur. The publication DE4436337 (A1) discloses a use of the recycled fabric for production of the isolation wool, but this method cannot be successfully applied to the processing of the filter material with active carbon. Publication CN204325589 (U) discloses a recyclation of the used filter bags where the material is cleaned by the ultrasound, but it does not offer the possibility of the energetically non-demanding and full-fledged use of the original components of the filter material. Solutions according to JPS57112414 (A) and HU227329 (B1) are similarly marginal, too.

Solution according to publication SK PUV 50116-2012 describes bunch material composed from non-textile particles intertwined with textile fibers, where the non-textile particles have solid form of the cuts or shreds or fragments. Such solution is fitting for the mixture entry material, mixed from various used parts of the products in the means of transport. The resulting bunch material is solid and suitable for construction material where the heat-isolating features are of secondary importance.

Solutions form recyclation of woven or non-woven fabrics are known and their essence lies in the release of the original shape or meachnical bonds between the fibers. The use of the existing devices does not bring about an applicable result for the processing of the filter material from polypropylene and/or polyethylene, where the carrier does not have a form of the textile, but it is more a semi-solid plate. During the recyclation of the polypropylene and/or polyethylene such methods are preferred which consists of addition of heat which alters the solidity and consistency of the material.

Such solution is desired and not known which would allow to valorize both components of the filter semi-finished product, that is, the carrier and active carbo, too, without the degradation of their use-value. New solution should be energetically effective and simple and it should be ready for application at the place of the production of waste—or in vicinity of such place—with a save of space.

SUMMARY OF THE INVENTION

The abovementioned deficiencies are significantly remedied by the method for the processing of the filter material with active carbon, where the filter material includes flat, at least partially permeable carrier on which the active carbon in form of granules is applied and where the filter material is processed mechanically, without the intake of heat, according to this invention, which essence lies in the fact that the filter material is processed at the presence of the air in a rotational disintegrator, the material is disintegrated by being repeatedly brought—during the retention time—into contact with the rotational elements which carry and throw away the material to the surface with the protrusions on the inner side of the cylindrical chamber of the disintegrator and the bunches are created by the process of aeration in such a way that the flat carrier is at least partially disintegrated into original fibers and the released fibers mutually intertwine, and at least part of the active carbon is separated from the carrier, whereby part of such release active carbon is crumbled into smaller fractions which stick to the surface of the fibers, and part of the active carbon is separated and led to the emergent bunches which in the lower part of the disintegrator run through the openings out of the chamber of the disintegrator.

The bunch is a spatial cluster of the mutually intertwined and randomly oriented fibers. The bunches can have various sizes and usually there will be a tendency to connect with the neighboring bunches; it is therefore necessary to understand "bunch" as general term for any group of disintegrated fragments of the filter material. The mutual connections in the bunches are based on the random intertwining of the fibers; in general the bonds of the fibers in the bunches are weak and the bunches can be separated by hand to smaller parts. This does not prevent the bunches according to this invention to be subsequently used in the applications where these bonds are strengthened by suitable additives pursuant to the particular application.

The permeability of the flat carrier in the filter filling is usually achieved in such a way that the material of the carrier has fiber structure; the spaces between the fibers create openings for the permeation of the filter medium. In case of the cleaning of the air it is possible to use various natural materials for this purpose which does not have to be resistant to water, btu it is always preferable of the filter filling is resistant to the random occurrence of the water, to biological degradation and so on. In case of the filter fillings in the cars for the cleaning of the air in the interior, the plastic materials are used for the flat carrier, which have excellent mechanical features, too. This allows to produce flate, semi-solid semi-finished products which is easily shaped; the semi-finished product can be shaped into the stable accordion, which ensures large surface for the contact with the air. It is preferable, but not the only possible, to use polypropylene and/or polyethylene which has suitable hygienic features and which is approved by health authorities—which has, for example, IDMS (International Material Data System) in case of its use in automotive industry. Excellent results of the processing according to this invention are achieved precisely with the filter material with polypropylene or polyethylene carrier.

Polypropylene carrier of the filter material has fine, solidly connected fibers which cross each other within a layer. The original fibers are placed on each other and connected during the heat in multiple layers, which creates a semi-solid plate. During the processing in the rotational disintegrator at least partial disintegration of this carrier occurs; disintegration releases the bonds between the fibers. Most of the fibers in the emergent bunches will have similar thickness as thickness of the original fibers of the flat carrier; the fibers in the bunches will correspond to the original fibers from which the carrier has been produced. It is not impossible to produce new structures from these fibers, where for example the originally thicker fiber is divided into multiple thinner or shorter fibers. It is also possible that some bonds between the fibers will remain integrated, but at least partial disintegration will always take place, for example at the edges of the individual fragments of the carrier. The bunches differentiate from the state of the art (for example SK PUV 50116-2012) als by the fact that they only involve disintegrated parts; they basically do not contain integrated pieces or fragments. If such parts are included in the bunches according to this invention, they will be only remnants within the allowed production margin. Total disintegration of the filter material brings about high use values—mainly heat-insulation parameters—which were only secondary in the prior state of the art.

The disclosed method can be suitably used for the filter material without active carbon, too. Such filter material will be processed in the rotational disintegrator at the presence of the air and disintegrated by being repeatedly brought during the retention time into contact with the rotating elements which carry and throw away the material to the the surface with the protrusions on the inner side of the cylindrical chamber of the disintegrator and by aearation bunches are created in such a way that the flat carrier is at least partially disintegrated to the original fibers, the released fibers mutually intertwine and bunches emerge in the lower part of the disintegrator and they transfer through through the openings out of the chamber of the disintegrator.

Usually the filter material involves active carbon at least at the amount of 35 $g/m^2$ of the surface of the carrier, preferably from 70 $g/m^2$ to 1000 $g/m^2$ of the surface of the carrier, especially preferable from 150 $g/m^2$ to 430 $g/m^2$ of the surface of the carrier, which can constitute, for example, the active surface of the active carbon from 8 100 $m^2$ to 75 000 $m^2$, depending on its particular features, such amounts of the active carbon at the entry point of the processing define the available amount, which can in the method according to this invention separated the separated active carbon from the active carbon processed in bunches.

Important part of the disintegration of the carrier with the active carbon is the simultanoeus separation of the active carbon from the flat carrier. The active carbon can be attached to the carrier by the layer of the adhesive or it can be welded to the surface of the carrier. A solution is common where the active carbon with the respective size of granules is closed between the two layers of the flat carrier and, at the same time, the health safe adhesive for the adhesion of the active carbon to both layers of the flat carrier is used. During the disintegration of the falt carrier the rotating elements in the disintegrator have high kinetic energy and they repeatedly hit the carrier, which causes the release of the bond between active carbon and carrier. Disintegrator operates at the presence of the air on its inside; the emerging semi-finished product is areated, which significantly diminishes the specific volume weight. During this process the part of the active carbon is crumbled to the smaller particles—usually to dust—which swirls inside the chamber of the disintegrator and thereby it reaches the surface of the released fibers. The adhesive, which is eventually used for attachment of the active carbon, is sparated during the processing in the disintegrator and separated from the flat carrier as well as active carbon and it can be separated from the mass of the processed semi-finished product. Preferably the adhesive is aggregated to the bunches which can be simply pulled out of the granulate of the active carbon.

The disintegrator has such arrangement that the entering filter material comes into repeated contact with the rotating elements and hits the profiled surface with the protrusions on the inner side of the chamber of the disintegrator; the disintegrator therefore should not operate as a device with a continuous one-step transfer of the material such as various shredders and so on. The disintegrator can also be called a device for disintegration of the fiber material, cutter, grinder, mincer, or mill- even though the flat carrier according to this invention is not milled or grinded in it, but disintegrated. The disintegrator during the method according to this invention works with a specific time of the retention of the material and it is preferable if this retention time is adjustable. During the method according to this invention there are multiple simultaneous processes in the disintegrator which bring about resulting synergetic effect, increase the productivity of the process while having low energy demands. The disintegration of the carrier is connected with the separation of the active carbon, whereby the active carbon is crumbled and applied to the surface of the fibers and part of the active carbon in the disintegrator is separated and collected. Part of the non-crumbled active carbon can remain in the bunches where the individual granules of the carbon get stuck in the bunches of the fibers. These granules are held mechanically, compared to the thickenss of the fibers they have sizes and weights which surpass the adhesive posibilities relative to the fiber. Dust particles of the active carbon stably adhere to the fiber which is in the intense dust whirl in the disintegrator covered basically on its whole surface. This is manifested, inter alia, by the fact that the originally white filter material is colored grey. For the distribution of the active carbon to the fibers it is necessary to create the whirling of the dust of the active carbon and, at the same time, retain the material for a necessary time in the chamber of the disintegrator.

In the preferable arrangement the disintegrator involves the cylindrical chamber where the rotor with the rotating elements is rotably placed. These elements can be connected to the rotor by rotational studs, which allows their simply replacement or alteration of configuration with various number of rotating elements. During the rotation of the rotor the rotating elements are carried by the centrifugal force to its functional position, but in case of the hit against the solid obstacle the rotating element can be rotated along the stud, which prevents the more serious damage of the device. The rotor together with the elements is statically and dynamically balanced so that high rotational speed can be achieved without vibrations or noise.

The emergent bunches fall through the openings in the lower part of the disintegrator. Setting the dimensions and shapes of the openings in the sieve can adjust the retention time of the material in the disintegrator. The material which does not fall out through the openings is repeatedly carried to the movement along the circumference of the chamber, where it is being hit by the rotating elements; the carried material is thrown to the circumference of the chamber—mainly to the surface with the protrusions. The dynamics of this movement are determined mainly by the circumferential speed of the rotating elements, which ranges from 20 to 300 $m.s^{-1}$, preferably 20 to 180 $m.s^{-1}$, especially preferably 45 to 100 $m.s^{-1}$. This relatively high speed ensures the desired course of the process where the material hits the surface with the protrusions at high speed and energy. The bunches falling out of the disintegrator have air gaps between the fibers, which are usually several times larger than the thickness of the fibers, which significantly lowers the specific volume weight of the bunches relative to the specific volume weight of the original materials.

Significant lowering of the relative volume weight of the filter material during the retention time in the chamber of the disintegrator is a significant feature of this invention. The increase of the relative volume is related to the high degree of the aeration of the bunches and the air fulfills the function of the heat insulant. Here we can see, too, that the disintegration—production of fibers and bunches—is energetically very effective. During the production of mineral insulation it is necessary to add a lot of energy for the melting of the stone semi-finished product, for example basalt. During the production of the insulation material according to this invention the fibers are produced without the intake of the heat; a situation is used that the fibers were produced before, even though for different purpose.

In order to increase the productivity of the processing in the disintegrator, the filter material can—before its entry to the disintegrator—be firstly divided to parts, fragments with the predefined approximate size. This division of the filter material unifies the dimensions of the intermediate product, which subsequently enters the disintegrator. According to the method according to this invention the filter material of various shapes and dimensions is processed. The remnants of the production of the filter fillings which are processed have shapes and dimensions determined by the cutting plan; usually they will be smaller pieces originating in the space between two cut-outs and longer pieces from the edges of the semi-finished product. Among this waste there can also be whole, continuous pieces which originate during the initial placement of the semi-finished product into the technologicaly devices, or to the feeders, respectively.

The preliminary phase divides these planar objects and cuts them to smaller pieces of approximately same dimensions. The planar divider is preferably used for planar division—it is a rotational machine operating as a grinder or cutter which has rotating blade segments cooperating with the fixed blade segments. The distribution and mutual configuration of the blade segments determines the sizes of the resulting pieces of the semi-finished product. Planar division will usually be a one-step transfer process, preferably the semi-finished product can fall directly or through the conveyor to the feeder of the disintegrator.

The length of the fiber which is released in the main stage of the processing will be defined by the dimensions of the semi-finished product divided in the preliminary phase. The size of the planar intermediate product from the preliminary phase is related to the retention time in the disintegrator, or to the degree of the disintegration in the disintegrator, respectively. If the filter material is not divided to smaller pieces, it has to remain in the disintegrator for a longer time so that the sufficient disintegration takes place. Therefore the reduction of the intermediate product in the preliminary phase makes the operation of the disintegrator in the main phase more effective, but it is not entirely necessary for achievement of the desired result.

Reduction or unification of the entering filter material can be realized already in the phase of production of the industrial waste. This can be achieved in such a way that during the cutting of the semi-finished products for the production of the filter fillings they are cut into the necessary shape. This means that the machine which cuts the semi-finished product itself cuts the resulting waste to required small pieces. This cannot does not have to be complete, since small pieces on the line would complicate their transfer or removal, respectively. Individual pieces can be connected by the uncut strips, which will make the remnants connected and capable of being transferred together in one acft. After their insertion to the disintegrator the small strips will be cut and the pieces of the filter material behave as if planarly divided in the specialized machine within the preparation for the entry to the disintegrator. The optimal method will contain another step, where the bunches coming out of the disintegrator are sifted so that the granules of the active carbon are at least partially separated from them.

It is common that in cases of air filters an active carbon of the biological origin is used, which is of high quality and which is expensive. During the processing of the filter material according to this invention a release of the granules of the active carbon without its degradation takes place, the processing uses neither the intaken heat nor chemical preparations, and therefore the separated active carbon remains intact. Separation of granules from the flat carrier takes place—to a small degree—already in the preliminary phase, if the particular process contains such phase. Significant separation of the active carbon takes place during the disintegration in the disintegrator. In this phase the granules can be collected below the chamber of the disintegrator, where the granules fall between the bunches. It can be simply separated from the bunches by the sieve with the appropriate size of the openings. The sifting of the bunches from the disintegrator can take place, for example, in the rotating cylindrical sieve with adjustable slope. The regulation of the slope and the rotation speed sets the time of the sieving of the bunch during which the bunch rolls on the sieve and the granules of the active carbon fall out. In another arrangement a conveyor sieve, or shaker screen and so on, can be used; any dry sieving which does not force presses the bunches can be used. Small dust particles of the active carbon remain on the surface of the fibers. Here it is important that it is not necessary to remove all granules of the active carbon from the bunches, since the resulting product from the processing of the filter material have many uses during which the presence of the active carbon in form of the granules stuck between the fibers is an advantage. The final sieving therefore does not seek the complete removal of active carbon in form of granules, its task is only to achieve its particular ration in the resulting product. On one hand, it is preferably to separate the free active carbon and use it as a precious basic material in many products, on the other hand it is necessary not to prolong the time of processing uselessly, so that the desired efficacy and performance of the process is achieved.

In order to improve the ecological benefits of the processing it is preferable if the process is realized at the place where the remnants of the filter materials emerge, or in the vicinity of such place. In case of the recycling of the used material it is necessary that the waste is collected from many users; the recycling entails its transport to the place of processing. In this direction the method according to this invention brings advantage in the fact that it is energetically and spatially non-demanding. It is thus preferable if the filter material is processed directly in the vicinity of the place of cutting of the semi-finished product for the production of the filter fillings. The processing can be a final phase of the cutting of the semi-finished product from the flat strip of the filter material, or it can be a phse which is realized independently on the production of the filter inserts, but in the vicinity of this production. Pursuant to the low energy demands the filter material can be processed in the mobile device, too, for example within the mobile container or on the trailer of the truck, and so on.

The deficiencies in the prior state of to art are significantly remedied by the device for the processing of the filter material, too, mainly of the filter material with the active carbon, where the filter material involves flat permeable carrier on which the active carbon in form of the granules is applied, and where the device includes a disintegrator with the rotating elements which are placed on the rotor, whereby the disintegrator has an opening for the insertion of the processed filter material in its upper part and in its lower part it has outlet openings, according to this invention, which essence lies in the fact that the disintegrator has in its upper part on the inner side of the chamber a surface with the protrusions, whereby the surface is placed adjacently to the rotating elements and the distance between those elements and the protrusions is at least 3 mm, preferably at least 5 mm. Rotating elements do not get into direct contact with the potrusions on the inner surface of the chamber. The surface with the protrusions creates a narrowed section between the rotor and the chamber of the disintegrator. In the lower part the disintegrator has a broadened zone. In the narrowed zone the filter material is mechanically disintegrated; the rotating elements in this zone hit the filter material which is retained in the zone with the narrowed section. The broadening of the zone in the lower part should create the free space for the increasing volume of the intermediate product. The broadening of the space between the rotor with the blades and the inner cylindritcal surface of the body of the disintegrator prevents the pressing of the intermediate product. In order to achieve good result it is preferably of the distance between the inscribed circle of the coating of the chamber with the tightened (narrowed) zone and the inscribed circle of the coating of the chamber with the broadened zone is at least one tenth of the diameter of the larger inscribed circle, whereby all circles are concentric.

The bunches in the lower part of the chamber fall through the openings in the perforated part of the cover of the disintegrator. One opening has a surface size ranging from 25 $mm^2$ to 2500 $mm^2$, preferably to 900 $mm^2$. Openings in the shape of the quadrilateral with sides from 7 to 25 mm, or to 16 mm, eventually, are preferable. The change of the size of the openings alters the retention time.

The disintegrator will usually have horizontal axis of the rotation of the rotor with the rotating elements, but it can also have vertical axis of rotation, or the slope of the axis can be adjustable, which can achieve a regulated movement of the material through the axis of the rotation. In such case the entry zone of the disintegrator is placed above by one edge of the rotor and the outlet zone is present below at the opposite edge of the rotor; the processed material moves from up downward and also along the axis of the rotation of the rotor.

Excellent results of the disintegration and aeration of the filter material were achieved with the rotating elements which have plain or tooth blades. The rotating elements can be called "blades", but important function of the rotating elements is tearing and throwing of the process material to the outer circumference of the cover of the disintegrator, that is, to the inner surface of the chamber. Such hits contribute to the disintegration of the fibers; the hits are basically broad frequency mechanical impulses. The broad frequency spectrum of the incitement is preferably for the release of the solid mechanical bonds. Individual mutual bonds of the fibers—as produced during the production of the carrier of the filter material—have random character and during the hits of the particular part of the material the mechanical system "chooses" the frequency compenet of the incitemenet for the particular frequency characteristic of the given mechanical system.

The disintegrator can have adjustable rotations of the rotor, for example by means of a frequency converter. The high availability of regulation of the rotations is preferable, when the circumferential speed of the rotating elements can range from 20 to 180 m.s-1, preferably 45 to 100 m.s-1. The distance between the support surfaces with the protrusions and the rotating elements in a higher, narrow zone of the disintegrator can be adjustable as well. The adjustement of this distance can alter the mechanical features of the resultion product. The rotating elements can be placed on the rotor on the studs, whereby centrifugal force pushes them into operating position.

The disintegrator can have a sieve for separation of the active carbo, but the main part of the separation of the active carbon will usually belong to the sieving device of the separator, which will be introduced as an independent device after the disintegrator.

In the preferable arrangement the system and the device involve the planaer divider for the preparation of the intermediate product entering the disintegrator. The planar divider can have a form of a one-step transfer cutter, grinder, shredder, etc. The planar divider's function is to stabilize and unify the length, width and thickness multiplicity of the processed filter material. The planar divider can be rotational, too. It can consist, for example, from the cylinder in the box, where the cylinder have dividing segments on the surface, which during the rotation run by the stable dividing segments which are attached in the box. The gap between moving dividing segments and fixed dividing segments can range from 0.1 to 20 mm, preferably from 0.3 to 20 mm, especially preferably from 0.5 to 7 mm. In order to achieve the reliable transfer of the processed filter material it is preferable if the moving dividing segments are arranged in four lines by eight segments and distributed evenly on the outer surface of the cylinder of the planar divider. The moving segments can be in each line arranged in the line of the helix, thanks to which they enter gradually into grip and this prevents the simultaneous hit of multiple segments, which could lead to undesired mechanical phenomena in the system.

Mechanical separator can be part of the system and device; the function of the separator is to separate the active carbon from the emerged bunches. The separator will be arranged after the outlet from the disintegrator either directly or by means of the conveyor and/or pipes. The separator's construction can vary according to the principle of separation in use. The separator can involve rotational sieve with the adjustable slope of the movement of the material in the sieve, or with adjustable rotation speed, too. The adjustement of the slope or rotation speed alters the retetntion time and period of rolling of the individual bunches in the sieve. The prolonging of this period diminishes the contect of the active carbon in form of granules in the resulting product. The sieves have openings, preferably with the surface less than 9 cm². The openings in the separator will usually be smaller than the openings in the lower part of the chamber of the disintegrator.

The separator can in other arrangement consist of the set of vibration sieves, whereby the material regulatedly moves to the outlet.

It is preferably if the separator includes a discharger for the discharge of the bunches. The discharger can be helix-shaped. In the lower part of the separator there is a trough for the collection of the separated active carbon. A screw conveyor can be in the trough, whereby it transfers the active carbon out of the separator.

The planar divider, disintegrator and separator can have various mutual spatial position in the resulting system; they can be placed above each other which ensures the gravitational transfer of the material; they can be placed by each other, and so on. It is also possible to create a complex construction of the device which would involve planar divider, disintegrator and separator. This allows, for example, to diminish the total space which is necessary, or to diminish the number of the propulsive engines needed, and so on.

During the method of processing according to this invention the technological waste materials produced during the production of the air filters containing active carbon are used and valorized. The transfer of the filter materials—which are heavy burden for the environment—to the dump is either limited or entirely cancelled. By means of this invention the non-degraded active carbon is gathered; this active carbon is suitable for the repeated use for the production of the filter products containing active carbon, or for other applications. The invention significantly lowers the costs of energy, devices and technological procedures.

The result of the method according to this invention is fibrous, aerated matter with low specific volume weight—lower than 1.4 g/cm³, preferably lower than 0.3 g/cm³, especially preferably lower than 0.1 g/cm³. Suitable fluffing allows one to achieve the volume weight ranging from 0.005 to 0.05 g/cm³. The fibrous matter is manifested outwardly as bunches. The fibers are from polymer from the polyolefin group. In preferable arrangement the fibers are from polypropylene and they are the fibers forming the original permeable carrier of the filter material. The polypropylene has very good chemical and mechanical resistance. The fibers are not oriented—they are distributed randomly and they are mutually at least partially intertwined, with the air gaps between the fibers. In case the filter material with the active carbon is processed, the fibers in the bunches have dust particles of the active carbon on their surfaces. The fibrous matter also contains the granules of the active carbon which are stuck in the gaps between the fibers. The content of the granules of the active carbon can be up to 87% of the mass of the resulting product, usually up to 0.01 g/cm³. The covering of the surface of the fibers with the dust from the active carbon improves the fire resistance of the resulting product. For example, the polypropylene is usually used during applications with temperatures up to 110° C., at 165° C. it starts to melt. Covering the polypropylene fibers with the active dust carbon significantly improves the heat resistance of the resulting fibrous matter. In case of the fire there is not dangerous smoke, nor are the toxic halogenated hydrocarbons released. Smoke, fumes and residues are mainly tied to the surface of the active carbon. The active carbon can be separated from the fibrous matter during the processing to such degree that its remaining amount in the resulting bunches will be negligible; its trace amounts will be hard to measure. In such case the active carbon will not even color the original material of the fibers and the coloring will be weak.

The bunches can be adjusted by addition of various additives; or example a fire retardant can be added. It is preferable if the additives are added after the separation of the active carbon, so that it can be used in the pure, unadjusted state in the full-fledged application.

The resulting product in form of bunches is preferably used as a heat and noise insulation. The resulting product is directly a heat insulant, or it serves as a semi-finished product for the production of various heat isolating materials, filter materials, mainly for the construction industry. The bunches can be a semi-finished product for other insulation or costruction applications.

Low specific volume weight at the level below 0.1 g/cm³ expresses high share of the air in the gaps between fibers. The basic polypropylene has density ranging from 0.89 g/cm³ to 0.92 g/cm³. The processing of the filter material according to this invention leads to the aeration, where the free outer volume density is significantly increased—that is, approximately ten times and more; preferably 50 to 100 times more. Even in case of small weight ratio it is capable of absorbing various dangerous substances. The insulation can be used in industrial applications, mainly in construction and so on. The product according to this invention can—in construction industry—serve mainly as an insulation-filter material with new physical and chemical dimension of the features mainly in health and hygienic fields, mainly concerning the features of antibacteriality, zero spread and growth of the molds and fungus, and effective absorbtion of the dust particles and harmful substances in the air.

The resulting product of the processing is also the active carbon in form of granules itself, which can be preferably used for various applications. The repeated use for the production of the filter material is not ruled out, too; for example a filter material for the air conditioning units for the filtration and recovery of the air in the industrial and pharmaceutical production, in hospitals, in electrotechnical industry, in food industry, or in trade and services.

BRIEF DESCRIPTION OF DRAWINGS

The invention is further disclosed by the drawings 1 to 7. The elements and devices are depicted schematically, the ratio of their sizes is for illustration purposes only and cannot be interpreted as limiting the scope of protection. The depiction of the particular group of fibers as well as the spatial arrangement of the individual machines in the system is for illustration purposes, too.

FIG. 1 depicts the two-layer carrier with the active carbon between the layers; FIG. 2 is an example of the shaped semi-finished product for the production of the filter filling;

EXAMPLES OF REALIZATION

Example 1

Figure 1:
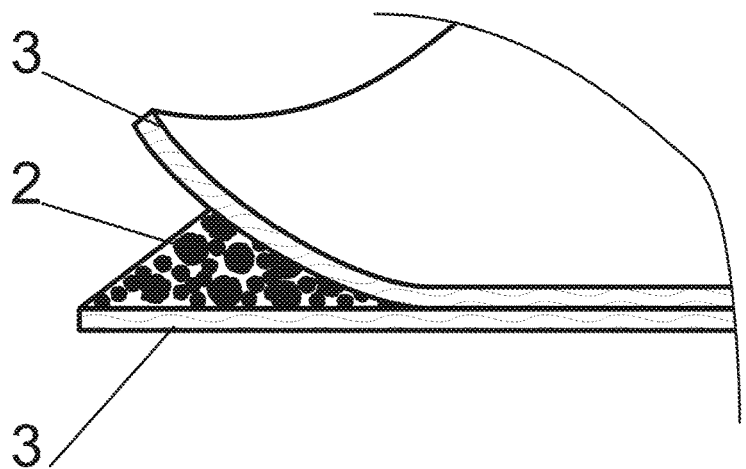
FIGS. 1 and 2 depict the filter material according to the state of the art which is being processed.
Figure 2:
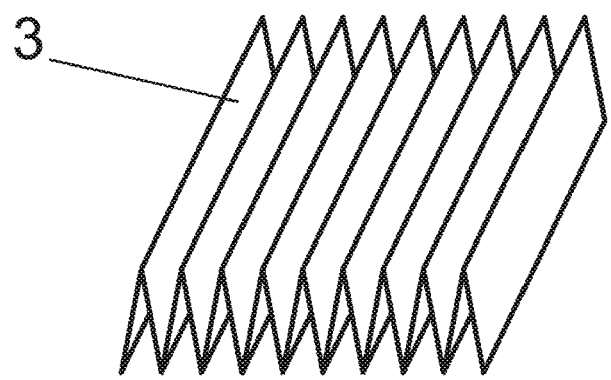
Figure 3:
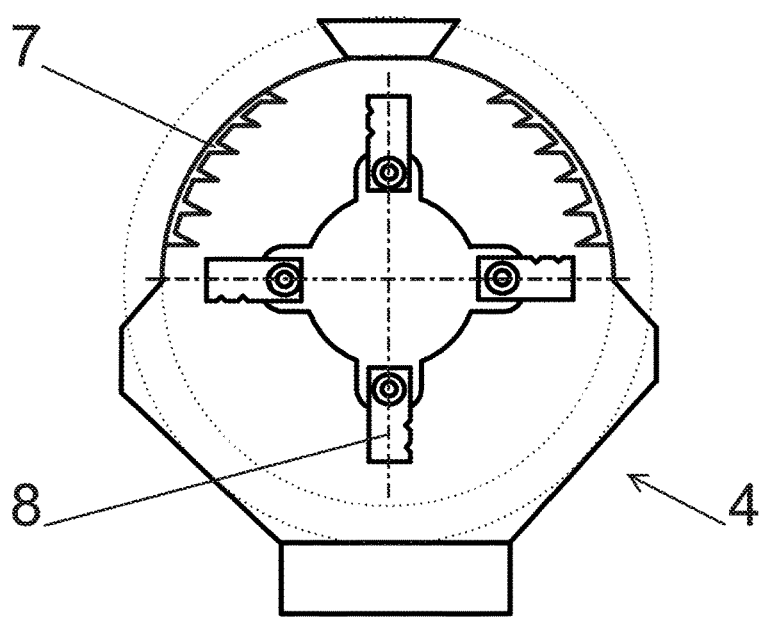
FIG. 3 depicts the device for processing of the filter material in the most basic system which has only the disintegrator. The dotted lines denote the inscribed circle within the chamber of the disintegrator.
Figure 4:
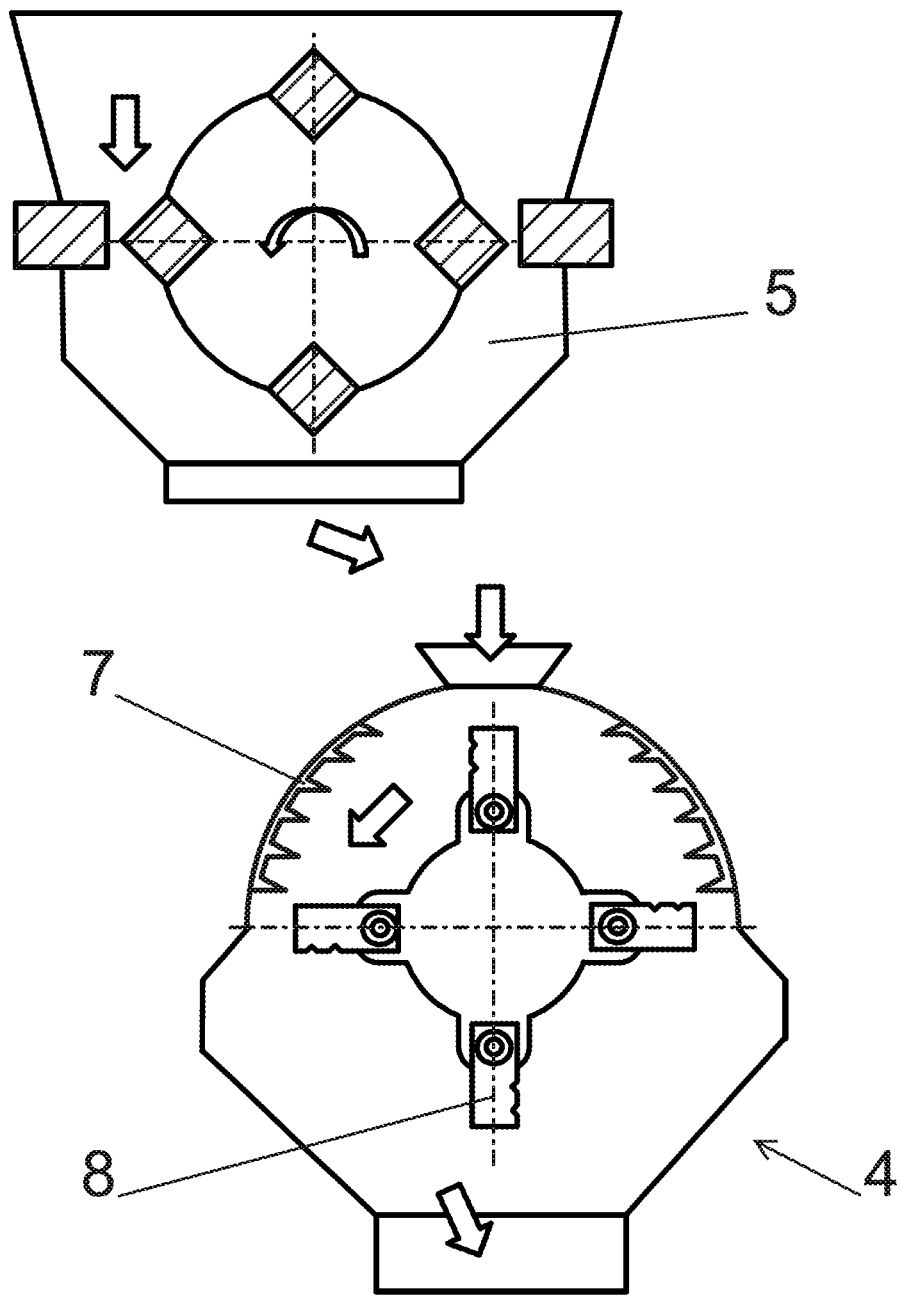
FIG. 4 is a view of the device which involves the preliminary planar divider and disintegrator. The arrows denote the movement of the material during processing.
Figure 5:
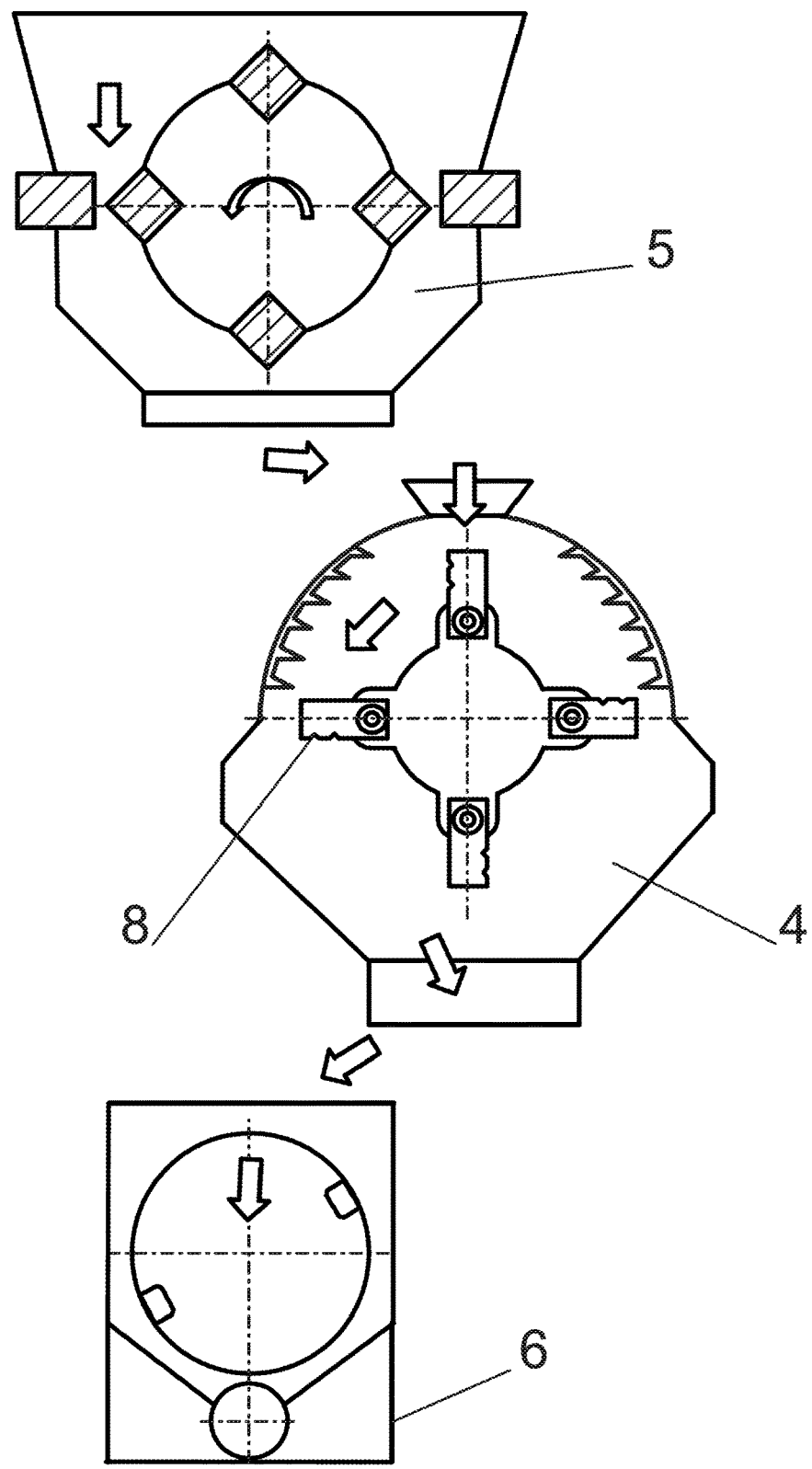
FIG. 5 depicts the device which includes the preliminary planar divider, disintegrator and the rotational sieve. The arrows denote the movement of the material during processing.
Figure 6:
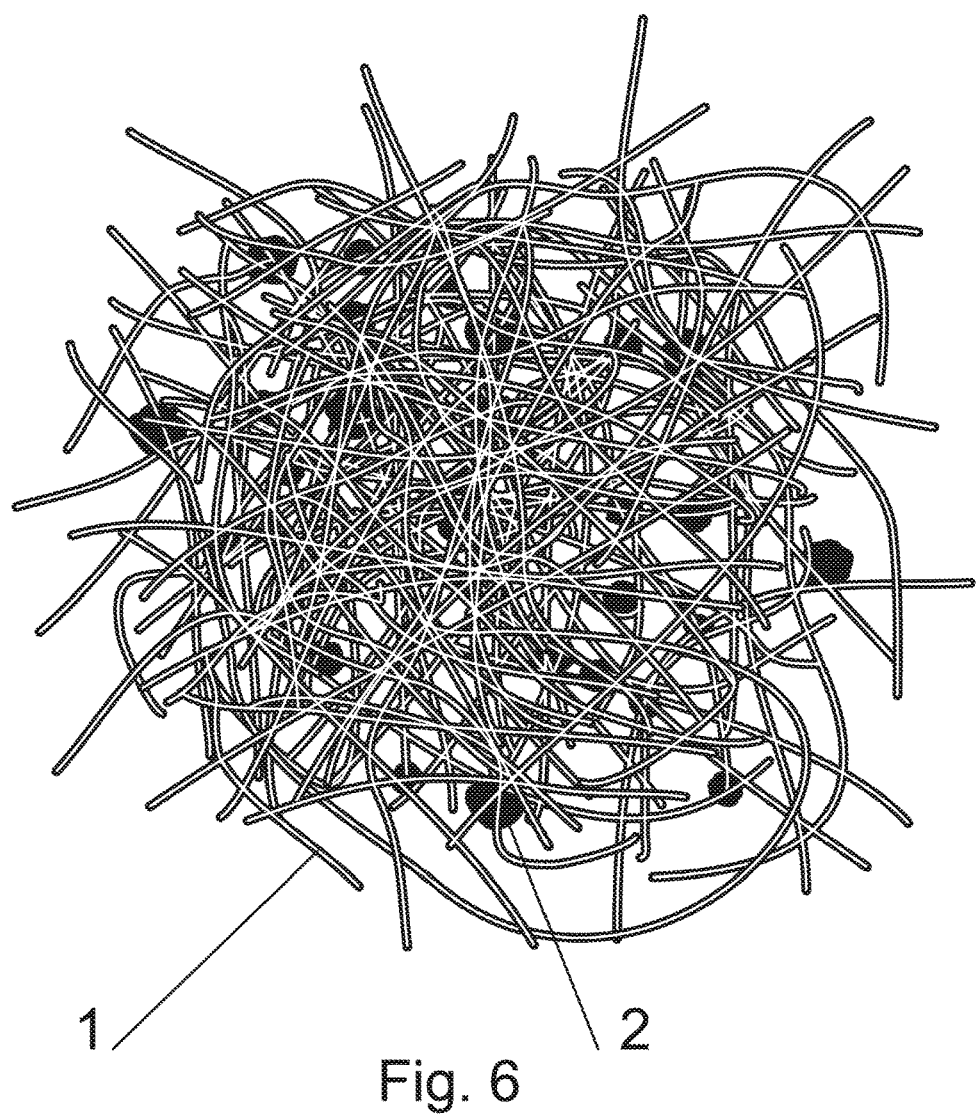
FIG. 6 is a microscopic view of the bunch with the polypropylene fibers, where the granules of the active carbon are captured between the fibers.
Figure 7:
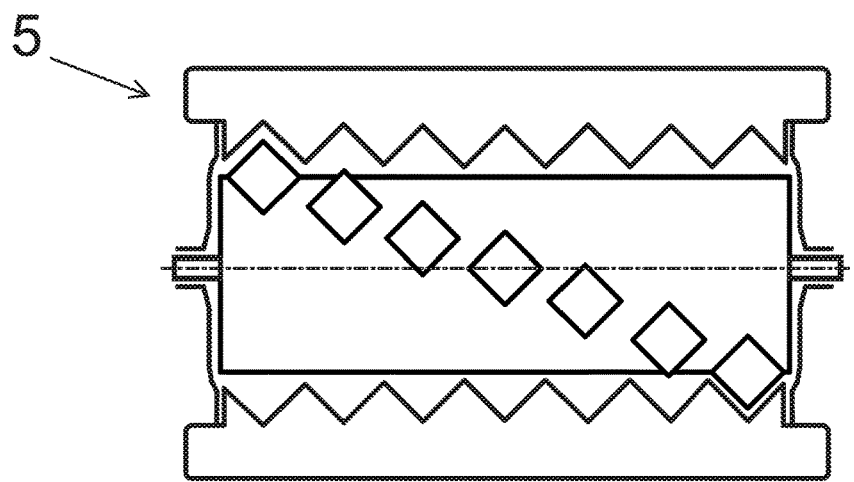
FIG. 7 depicts gradual distribution of the blades in the planar divider.

In this example according to FIGS. 1, 2, 3, 5 to 7 the filter material which remains from the production of the cabin air filters is being processed. The semi-finished product for the filter filling is cut from the strip which is rolled from the pack. The filter material has two layers of the flat carrier 3, whereby the active carbon 2 is distributed among them in form of granules with the surface weight 350 g/m². The weight of a single layer of the flat carrier 3 is 60 g/m².

The flat carrier 3 is formed by the polypropylene nonwoven system of the fibers 1 with air gaps between them. In this example the active carbon 2 is produced from the biological basis, for example from coconut. The active carbon 2 in this example is held on the flat carrier 3 by means of the harmless adhesive, which also holds both layers of the flat carrier 3 together; in other cases the active carbon 2 can be held between the layers of the flat carrier 3, whereby the layers are stuck together by the heat. After the cutting of the desired shape of the semi-finished product for the filter filling, the cut-outs and strips of various sizes remain from the original strip of the filter material. These remnants are thrown to the planar divider 5, where during a single passage smaller pieces are produced; these fragments' dimensions do not surpass 6 to 10 cm. This leads to flat division; the edges of the produced pieces can have frayed edges, which signals their partial disintegration on the edges—however, this disintegration on the edges is still marginal and insignificant.

The intermediate product from the planar divider 5 is together with the small amount of the released active carbon 2 transferred to the mouth of the disintegrator 4. The intermediate product is captured by the rotating elements 8 of the disintegrator 4, which have high circumferential speed. The elements 8 with high kinetic energy hit the pieces of the flat carrier 3; the hits cause disintegration in the place where the element 8 hits. The disintegrator 4 has a tightened, narrowed zone with the support surface in its upper part which captures the pieces so that they do not start moving concurrently with the rotation of the rotor of the disintegrator 4. The pieces of the material are thrown to protrusions 7 which lead inside the chamber, whereby the protrusions 7 do not enter into direct contact with the rotating elements 8.

The pieces with the varying degree of disintegration head downward to the sieve in the lower part of the disintegrator 4, whereby they are carried upward to the further contact with the rotating elements 8 in the tightened zone of the disintegrator 4. The movement of the rotor of the disintegrator 4 and the movement of the elements 8 produces strong air swirl (vortex) which halps to carry the pieces from the lower part of the zone of the disintegrator 4; the swirl mainly distributes the dust of the active carbon 2 to the surface of the fibers 1. The air swirl also causes aeration of the resulting bunches. Part of the released active carbon 2 in form of the granules falls through the sieve in the lower part of the disintegrator 4 and this active carbon 2 continues to the separator 6.

The bunches in the lower zone of the disintegrator 4 have a structure of the intertwined fibers 1, whereby the active carbon 2 in form of granules is randomly captured between them. In this example the rotations of the disintegrator 4 are set to achieve the circumferential speed 59 m.s$^{-1}$; the period of retention of the material in the disintegrator 4 is on the order of the tens of seconds. The resulting bunches coming out through the sieve in the lower part of the disintegrator 4 have a specific volume weight 0.011 g/cm³ in the unpressed (expanded) state.

The material from the disintegrator 4 is transferred to the rotational separator 6 where the bunches roll and move slowly on the sloped inner surface of the cylindrical separator 6. The granules of active carbon 2 are released from the bunches. The active carbon 2 in form of the dust particles which adhere to the surface of the fibers 1 is no longer released during the movement in the sieve in the separator 6.

Active carbon 2 in form of granules is gathered below the separator and collected in the vessel together with the active carbon 2 separated already in the disintegration phase in the disintegrator 4.

The resulting product in this example can be used as heat or noise isolation in the building or house. The active carbon 2 contained in the isolation captures various smells and dangerous substances; it clears the air which runs through the vapor permeable layers of the building envelope. Thanks to the active carbon 2 the isolation is antibacterial, with zero spread and growth of molds and fungus as well as with effective capturing of the harmful substances an smells from the air.

Example 2

In this example the cutting plan of the semi-finished product is supplied by the fact that the remnants at the same time are divided to smaller pieces. These pieces are connected with tight strips; usually each piece will have at least three connecting strips. The remnants of the filter material with this structure are thrown to the disintegrator 4, where the disconnection of the connecting strips and freeing of the pieces happens at the first contact with the rotating elements 8. The disintegration and aeration subsequently takes place in the disintegrator 4, as described in the previous example. Setting of the rotation speed of the rotor in the disintegrator, as well as retention time in the disintegrator 4, differ compared to previous example. In this example the speed of the rotating elements 8 is approximately 70 m.s$^{-1}$.

The resulting product has specific volume weight 0.008 g/cm$^3$.

Example 3

The resulting product is used as a filling for the separator of the gasoline fumes in the motor vehicle. For this purpose the bunches do not run through the separator 6 in order to ensure high share of the active carbon 2 in form of granules, which have absorption function in the application.

Example 4

Bunches are sprayed by aerosol with flame retardants after they leave the separator 6. At the construction site, the bunches are pressed through the hose to the gaps in building construction by means of a fan; they function as heat and noise isolation.

Example 5

Planar divider 5 in this example has simplified construction with one line of the moving segments only. In this example, the sieve below the cylinder of the planar divider 5 is used, too, which determines the desire size output.

INDUSTRIAL APPLICABILITY

Industrial applicability is obvious. According to this invention it is possible to repeatedly produce and use industrial, non-polluted remnants of the filter material which contains active carbon, whereby the original physical and chemical features of the original material are advantageously used without degradation.

LIST OF RELATED SYMBOLS

1—fiber
2—active carbon
3—flat carrier
4—disintegrator
5—planar divider
6—separator
7—protrusions
8—element
IMDS—International Material Data System—registry of the materials in automotive industry

The invention claimed is:

1. A method for processing a filter material with an active carbon (2), where the filter material includes a flat carrier (3) that is partially permeable, whereby the active carbon (2) is in form of granules and is on the flat carrier (3), the flat carrier (3) includes mutually connected fibers (1) made of a thermoplastic polymer, the method comprising the steps of;
    processing the filter material mechanically as a waste without an intake of heat,
    placing the filter material in a rotational disintegrator (4) in a presence of air, whereby during a rotation the filter material is repeatedly brought into contact with rotating elements (8) and bunches of the fibers emerge in the disintegrator (4) by aeration in such a way that the flat carrier (3) is at least partially disintegrated from the mutually connected fibers (1),
    separating the active carbon (2) from the flat carrier (3),
    crumbling into smaller particles a part of a separated active carbon produced by the rotating elements (8) inside the rotational disintegrator (4),
    adhering the smaller particles to a surface of the mutually connected fibers (1);
    passing through an opening located on a lower part of the disintegrator (4) the bunches of fibers ;
    discarding part of the separated active carbon; and
    wherein a volume weight of the bunches of fibers decrease below 1.4 g/cm$^3$.

2. The method of the processing of the filter material with the active carbon according to claim 1, wherein the mutually connected fibers (1) are selected from a group of material consisting of polyolefins, polypropylene, and polyethylene.

3. The method of the processing of the filter material with the active carbon according to claim 1, wherein a rotation of the elements (8) in the disintegrator (4) creates an air swirl which carries dust particles of the active carbon (2) and distributes them on the surface of the fibers (1).

4. The method of the processing of the filter material with the active carbon according to claim 1, wherein the rotational disintegrator (4) has a circumferential speed ranging from 20 to 300 m.s$^-$.

5. The method of the processing of the filter material with the active carbon according to claim 1, further including the step of dividing into pieces the filter material before entering the disintegrator (4) , the pieces each having a dimension of less than 10 cm.

6. The method of the processing of the filter material with the active carbon according to claim 5, wherein the filter material is divided in a shredder (5) which is placed before the disintegrator (4); an output from the shredder (5) leads directly to an input of the disintegrator (4).

7. The method of the processing of the filter material with the active carbon according to claim 6, wherein the filter material is disintegrated on its edges during the planar division.

8. The method of the processing of the filter material with the active carbon according to claim 5; wherein the pieces are held together in a single grouping by connecting strips which are later disconnected in the disintegrator (4).

9. The method of the processing of the filter material with the active carbon according to claim 1, wherein the bunches of the fibers coming out from the disintegrator (4) pass through a sieve, whereby the active carbon (2) in form of the granules falls down through the sieve.

10. The method of the processing of the filter material with the active carbon according to claim 1, wherein the bunches of fibers coming out from the disintegrator (4); pass to a separator (6) which separates the active carbon (2) from the bunches of fibers; or pass on a sloped surface of a rotational sieve.

11. The method of the processing of the filter material with the active carbon according to claim 1, further including the step of collecting into vessels the active carbon (2) separated in the disintegrator (4) ; wherein the active carbon (2) remains in the resulting product in an amount up to 0.01 g/cm$^3$ of a volume of a resulting product in an uncompressed state.

12. The method of the processing of the filter material with the active carbon according to claim 1, further including the step of separating from a semi-finished product an adhesive added to hold the active carbon (2) on the flat carrier (3) after the separation step of the active carbon (2) from the flat carrier (3) in the disintegrator; the adhesive is simultaneously aggregated into clusters.

13. The method of the processing of the filter material with the active carbon according to claim 12, wherein the adhesive is separated in a cyclone separator (6).

14. The method of the processing of the filter material with the active carbon according to claim 1, further including the step of adding an additive to the bunches of fibers after the separation of the active carbon (2) from the flat carrier; the additive is a flame retardant.

* * * * *